(12) United States Patent
Doglioni Majer

(10) Patent No.: US 10,196,201 B2
(45) Date of Patent: Feb. 5, 2019

(54) CAPSULE AND SYSTEM FOR THE BEVERAGE PREPARATION

(71) Applicant: TUTTOESPRESSO S.r.l., Milan (IT)

(72) Inventor: Luca Doglioni Majer, Carate Urio (IT)

(73) Assignee: TUTTOESPRESSO S.r.l., Milan (IT)

( * ) Notice: Subject to any disclaimer, the term of this patent is extended or adjusted under 35 U.S.C. 154(b) by 188 days.

(21) Appl. No.: 15/106,014

(22) PCT Filed: Dec. 18, 2013

(86) PCT No.: PCT/EP2013/077226
§ 371 (c)(1),
(2) Date: Jun. 17, 2016

(87) PCT Pub. No.: WO2015/090390
PCT Pub. Date: Jun. 25, 2015

(65) Prior Publication Data
US 2017/0036854 A1    Feb. 9, 2017

(51) Int. Cl.
*B65D 85/804* (2006.01)
*A47J 31/40* (2006.01)

(52) U.S. Cl.
CPC ........ *B65D 85/8043* (2013.01); *A47J 31/407* (2013.01); *B65D 85/804* (2013.01)

(58) Field of Classification Search
CPC ............... B65D 85/8043; B65D 85/804; A47J 31/3676; A47J 31/3695; A47J 31/3623
(Continued)

(56) References Cited

U.S. PATENT DOCUMENTS 8,986,763 B2 *   3/2015   BenDavid ........... B65D 85/8043
                                                          426/433
2005/0223904 A1 * 10/2005 Laigneau ............ A47J 31/0647
                                                          99/295
(Continued)

FOREIGN PATENT DOCUMENTS

EP          2 631 198 A1      8/2013
WO     WO 2011/154672 A1     12/2011
(Continued)

OTHER PUBLICATIONS

International Search Report dated Aug. 18, 2014, in PCT/EP2013/077226 filed Dec. 18, 2013.
(Continued)

*Primary Examiner* — Reginald L Alexander
(74) *Attorney, Agent, or Firm* — Oblon, McClelland, Maier & Neustadt, L.L.P.

(57) ABSTRACT

A capsule for preparation of a beverage from a brewing device, and a system including the capsule and brewing device. The capsule includes a lateral wall, a water inlet wall and an outlet wall forming a hollow body where a brewing product is contained. The hollow body has a central axis passing through the inlet and outlet walls. At least one portion of the inlet wall extends along an ellipse curve as defined by a circumference, having a diameter substantially equal to the maximum diameter of the lateral wall of the capsule lying on a plane inclined at an angle with respect to a first plane perpendicular with respect to the central axis of the capsule, the planes intersecting at an axis, the circumference being projected on a plane perpendicular to the first plane containing an axis selected from the intersection axis or an axis parallel to the intersection axis.

28 Claims, 6 Drawing Sheets

(58) Field of Classification Search
USPC ...................... 99/295, 323; 426/77, 112, 115
See application file for complete search history.

(56) References Cited

U.S. PATENT DOCUMENTS

| | | | |
|---|---|---|---|
| 2011/0045144 A1* | 2/2011 | Boussemart | ........ A47J 31/3695 |
| | | | 426/80 |
| 2013/0224340 A1 | 8/2013 | BenDavid | |
| 2014/0130678 A1 | 5/2014 | Frydman | |
| 2014/0196608 A1* | 7/2014 | Amrein | .............. B65D 85/8043 |
| | | | 99/295 |

FOREIGN PATENT DOCUMENTS

| | | |
|---|---|---|
| WO | WO 2012/079959 A1 | 6/2012 |
| WO | WO 2013/120997 A1 | 8/2013 |

OTHER PUBLICATIONS

Written Opinion of the International Searching Authority dated Aug. 18, 2014, in PCT/EP2013/077226 filed Dec. 18, 2013.

* cited by examiner

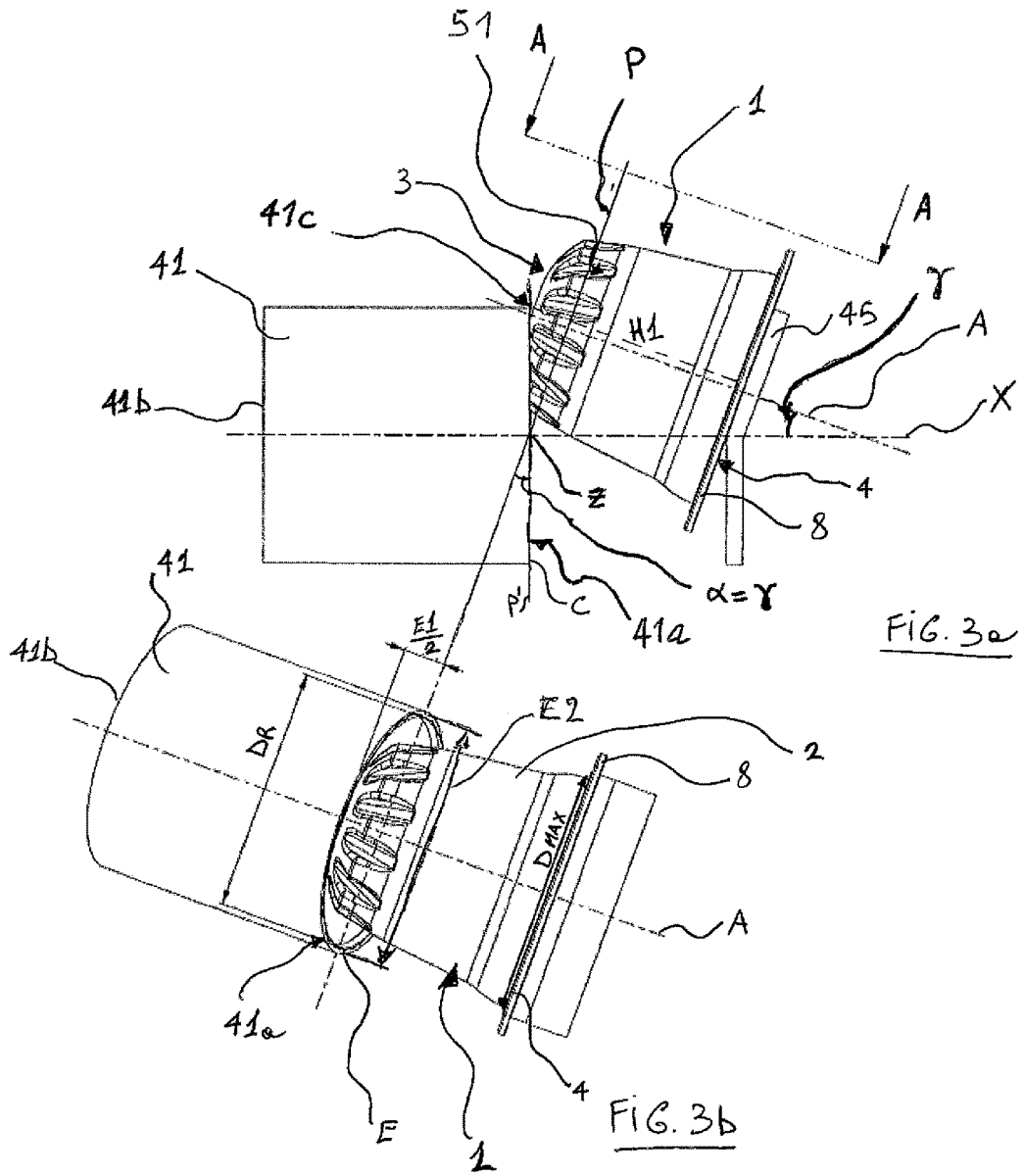

CAPSULE AND SYSTEM FOR THE BEVERAGE PREPARATION

The present invention relates to a capsule for preparing beverage, such as coffee, from a dose of one or more products contained inside the capsule by a brewing liquid injected into the capsule to extract the product contained therein. The invention also relates to a system for beverage preparation comprising a capsule according to the invention and a brewing device (beverage preparation device) for injecting the brewing liquid into the capsule.

BACKGROUND OF THE INVENTION

Beverage capsules comprise a hollow container portion that houses a dose of at least one extractable or reconstitutable product, generally ground coffee, but also tea herbal extracts, instant i.e. powdered drinks and liquid concentrates, are known in the art. The capsules also comprise a portion that interacts with a brewing device to prepare the required beverage. The typical brewing device comprises water heating means, an enclosing member, or receptacle, intended to cooperate with the capsule to define a preparation chamber and a pump or similar means so that the brewing liquid, usually but not exclusively hot water under pressure, can be supplied to the capsule for the extraction or reconstitution of the beverage from the dose of product contained therein.

The enclosing member, or receptacle, is usually movable with respect to the capsule, or vice versa, between an open position in which the capsule can be inserted into the brewing device and a closed position wherein the capsule is at least in part housed inside the receptacle. The receptacle is further provided with a circular pressing edge, intended to cooperate with the capsule, and in particular with a flange-like rim extending from the capsule, in order to form a seal tight engagement.

Therefore the capsule needs to be dimensioned so that it can be inserted into the brewing device, and to avoid undesired contacts between the capsule and in particular the inlet wall of the capsule with the receptacle, and in particular with its circular pressing edge.

Additionally, the capsule needs to be dimensioned so that it can be housed in the receptacle when the latter is moved towards the closed position.

At the same time the dimension of the capsule, and in particular the internal volume of its hollow body, must be able to contain a certain amount of extractable product, for example coffee powder, in order to obtain the desired quality and quantity of the brewed beverage. Therefore there is the need of maximizing the volume of the capsule while taking into account the dimension of the brewing device, and in particular the height of the capsule need to be dimensioned so that the capsule can be inserted into the brewing device.

Additionally, it has to be noted that in known brewing device the capsule is inserted into the brewing device with its central axis inclined with respect to the axis along which the receptacle is movable between the open and closed position.

Therefore, also the relative position between the capsule and the receptacle needs to be taken into account when the capsule is dimensioned.

In a known beverage preparation process, a capsule is fed into the receptacle of the brewing device and is fed with the brewing liquid, such as hot water.

The injected brewing liquid passes through the capsule and thus creates by dissolving the soluble solids contained in the foodstuff or solubilizing the powder contained in the capsule or otherwise diluting the liquid concentrate contained therein. In other words the injection of the brewing liquid inside the capsule allows for the constitution of the beverage from the ingredient enclosed therein. The beverage thus formed exits the capsule to reach a beverage collector or outlet spout and thence a cup or a container.

In the following description reference will be made to coffee preparation with hot water, this disclosure is exemplary and the scope of the present invention is not limited to coffee preparation with hot water.

It is known to provide open capsule, having the inlet wall (or inlet surface) and optionally the outlet wall (or outlet surface) of the capsules provided with holes to feed water inside the capsule. It is also known to utilize capsules in which the inlet wall and the outlet wall of the capsule are closed, i.e. the capsule body is in general a closed body, so that the coffee powder cannot be spilled out during handling or transport and the oxidation of the coffee powder is reduced.

Both "open" and "closed" capsules need to be dimensioned in order to maximize the internal volume and also allowing their easily and effective insertion inside the receptacle of the brewing devices.

Additionally, in order to open closed capsules, the brewing device is provided with piercing means, usually in the form of one or more protruding blades or perforators, intended to contact and to perforate the inlet wall and/or the outlet wall of the capsule. Apertures, or holes, formed by the piercing means allow the passage of the brewing liquid inside the capsule form the inlet wall and/or the extraction of the prepared beverage form the outlet wall.

Feeding of brewing hot water by piercing the inlet wall of the capsule is a method well known in the art and is disclosed in several prior art documents.

Recently, some problems have been encountered by using capsule made of plastic polymers instead of capsule made of more rigid material, such as aluminium. Capsules made of plastics can be difficult to perforate because of shapes of the piercing means that have been studied for use with aluminium only; as a result, full piercing of the capsule wall is not achieved, thereby no or not enough hot water can be injected in the capsule, or only a partial perforation is achieved, thus providing an irregular and unsatisfactory distribution of the brewing liquid inside the capsule and equally irregular quality of the beverage in the cup. For facilitating the perforation by piercing means of the brewing device plastic capsules have been provided with reinforcing members. However, the known solutions require a higher mass of thermoplastic material during the production process, resulting in a heavier, less environmental-friendly capsule.

Additionally, in some cases different brewing devices, provided with piercing means shaped in different manner, cannot achieve the perforation and in some cases the shape of the inlet wall and/or the presence of reinforcing means leads to an undesired reduction of the internal volume of the capsule wherein the dose of product is contained. A lower amount of the product contained inside the capsule inevitably leads to an unsatisfactory quality of the beverage obtained during the brewing process.

It is an aim of the present invention, to provide a capsule and a system for the beverage preparation using such capsule, allowing the maximization of the internal volume of the capsule body, in both "open" and "closed" capsules, in order to increase the quantity of product contained therein, thus increasing the quality of the prepared beverage.

At the same time, an aim of the present invention is to provide a capsule that can be easily inserted into the beverage preparation device, thus avoiding that the capsule is blocked inside the brewing device.

It is a further aim of the present invention to provide a capsule and a system for the beverage preparation using such capsule, allowing an effective perforation with piercing means belonging to different brewing devices and shaped in different manner. Another aim of the present invention is to provide a capsule that can be effectively used in different types of beverage preparation device, provided with different piercing means. Summary of the invention

SUMMARY OF THE INVENTION

These and other aims are achieved by means of the capsule according to the present invention, that is a capsule for the preparation of a beverage from a dose of a product, according to claim 1. A further object of the invention is a system for beverage preparation, according to claim 21. Further aspects are objects of the respective dependent claims.

The capsule according to the invention comprises a circular or conical lateral wall, a water inlet wall and an outlet wall forming a hollow body where a brewing product is contained. The hollow body of the capsule is provided with a central axis (A) passing through the inlet wall and the outlet wall. At least one portion of the inlet wall is extending along an ellipse curve (E) defined by a circumference (C), having a diameter substantially equal to the maximum diameter of the lateral wall of the capsule lying on a plane (P') that is inclined of an angle ($\alpha$) with respect to a plane (P) perpendicular with respect to the central axis (A) of the capsule.

Said planes (P) and (P') are inclined one to another in correspondence of an intersection axis and the circumference (C) is projected on a plane that is perpendicular to plane (P) and that contains an axis selected from said intersection axis between planes P and P', or an axis parallel to the intersection axis, to obtain said ellipse curve (E).

In general, the circumference (C) is projected on a plane passing through the central axis (A) of the capsule and the intersection axis (z), or an axis parallel to said intersection axis z, so as to define said ellipse curve.

It has to be noted that the axis passing through the centre of the circumference lying on the plane P' is preferably inclined with respect to the central axis of the capsule, or with respect to an axis parallel to the central axis of the capsule of said angle ($\alpha$) of inclination between said plane P and P'.

Advantageously, the elliptic shape of at least one portion of the inlet wall allows to maximize the internal volume of the capsule used to house the dose of product.

Additionally, the elliptic shape of at least part of the inlet wall allows to insert the capsule into the brewing device, and in particular into the receptacle of the brewing device, thus avoiding possible relative position between these elements causing the capsule to be blocked therein.

In particular, the elliptic shape of the inlet wall of the capsule allows to take into account that the capsule is inserted into the brewing device, and in particular into the receptacle, with the central axis (A) inclined with respect to the axis (X) along which the receptacle is moved to house the capsule.

It has to be also noted that the receptacle is generally provided with a circular pressing edge that is substantially equal in shape to the largest cross section of the lateral wall of the capsule. In other words, the diameter of the receptacle is substantially equal to the maximum diameter of the lateral wall of the capsule.

Therefore, when the capsule is inserted into the receptacle, the circular pressing edge of the receptacle is seen in a plane, passing through the central axis of the capsule, that is inclined with respect to the axis of movement of the receptacle, thus forming an ellipse curve.

More in detail, the circumference (C) having a diameter substantially equal to the maximum diameter of the lateral wall and lying on a plane (P') that is inclined of an angle ($\alpha$) with respect to a plane (P) perpendicular with respect to the central axis (A) of the capsule, substantially correspondent to the circular pressing edge of a receptacle of the brewing device inside which the capsule is inserted.

Therefore, the inlet wall of the capsule according to the invention, that is at least in part extending along an ellipse curve defined by a circumference corresponding to circular pressing edge of the receptacle, is able to take into account during the dimensioning process of the capsule, the shape of the receptacle of the brewing device and its relative inclined position with the capsule during the insertion therein.

It has to be noted that the capsule according to the present invention can be an open capsule, in particular having an open inlet wall provided with one or more openings, or any other suitable means, such as for example a porous membrane, intended to allow the injection of the brewing liquid inside the capsule.

The inlet wall can be also provided with a recessed portion wherein the injections holes are provided, preferably arranged in correspondence of the path along which the piercing means of the brewing device extend.

According to a possible embodiment at least a portion of the inlet wall can be covered by a foil or a membrane, for example made of or comprising aluminium.

The inlet wall of these capsules extend following at least in part an ellipse curve as it will be discussed in greater detail herein below.

The capsule according to the invention can be also a closed capsule in particular having a closed inlet wall. It has to be noted that in the latter case, the inlet wall comprises at least one piercing area intended to be contacted by piercing means of the brewing device inside which the capsule is used.

According to a possible embodiment, the inlet wall of the capsule may be provided with one or more breakable areas, intended to by broken when the inlet wall is contacted by the piercing means and/or by the water injected by the brewing device.

The breakable areas can be defined for example by one or more lines having a reduced thickness with respect to the thickness of the inlet wall outside said lines.

Advantageously, the elliptic shape of at least one portion of the inlet wall allows to maximize the internal volume of the capsule used to contain the dose of product, as mentioned above, and at the same time to allow an effective perforation of the inlet wall. Advantageously, the angle between the plane (P') on which said circumference lies and said plane (P) perpendicular to the central axis of the capsule, used to define said ellipse curve, is preferably equal to the angle between the central axis of the capsule and the axis of movement of the receptacle when the capsule is inserted into the brewing device.

In general, the angle between the plane (P') on which said circumference lies and said plane (P) perpendicular to the central axis of the capsule, is comprised in the range 15°-44°, preferably 15°-30° and more preferably 16°-25°.

According to exemplary embodiments also an angle comprised in the range 18°-22°, and preferably in the range 19°-21°, and most preferably an angle of about 20° can be chosen.

Additionally, the ellipse curve used to define the shape of the inlet wall is preferably arranged, on the plane on which the circumference is projected, with its minor axis substantially coincident with the central axis. The ellipse curve is also arranged in said plane on which the circumference is projected to be tangent to the highest point, or area, of the inlet wall with respect to the outlet wall.

According to a preferred aspect of the present invention, the at least one portion of the inlet wall extending along the ellipse curve, is comprised substantially between the central axis of the capsule and the piercing area of the inlet wall, and preferably between the central axis and the closest end part of the piercing area with respect to the central axis.

The capsule according to the invention can be used in a brewing device so as to form a system for the beverage preparation according to the invention. Preferably, the circumference used to the define the ellipse curve, and that is projected on said plane perpendicular to the plane P and passing through the axis z, or an axis parallel to the axis z, corresponds to the circumferential (circular) shape of the pressing edge of the receptacle of the brewing device used to house at least part of the capsule. According to an aspect, the circular pressing edge of the receptacle has the centre passing through the axis along which the receptacle is movable, and a diameter substantially equal to the maximum diameter of the lateral wall of the capsule.

BRIEF DESCRIPTION OF THE DRAWINGS

Further advantages and features of the present invention will be more apparent from the description below, provided with reference to the accompanying drawings, purely by way of non-limiting examples, wherein:

FIG. 3a is a lateral view of FIG. 3;

FIG. 3b is a view from above, along the plane A-A, of FIG. 3a.

DESCRIPTION OF PREFERRED EMBODIMENTS

The attached figures show the capsule 1 according to an exemplary embodiment of the present invention, for the preparation of a beverage, such as coffee, tea, hot and cold drinks, or any other liquid foodstuff, from a pre-determined amount of an extractable or soluble or dilutable product, either liquid or solid, contained inside the capsule. Preferably the dose of product comprise a granular or minced powder product, such as coffee powder or tea leaves, which are brewed by means of brewing liquid, preferably hot water under pressure, that is injected into the capsule for obtaining the desired beverage.

Figure 2:
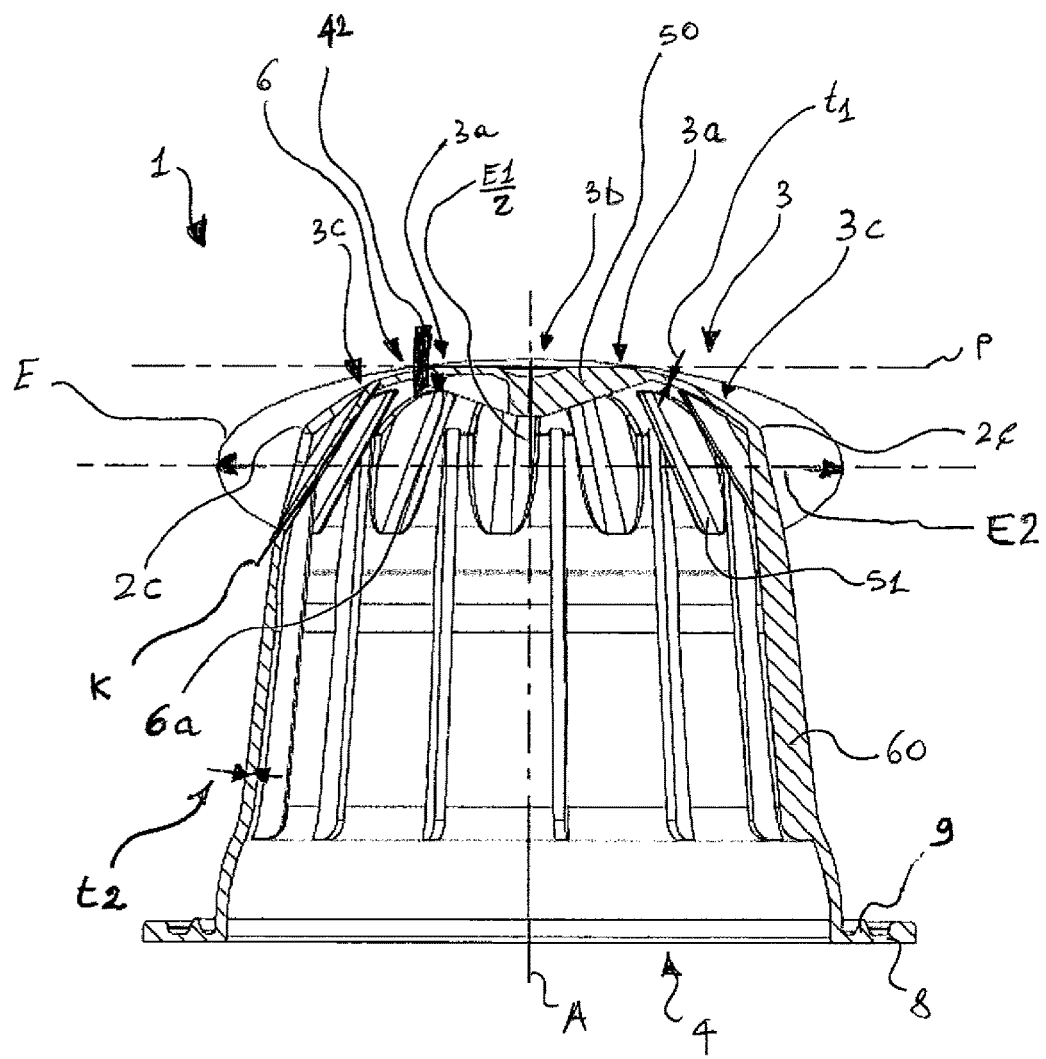
FIG. 2 is a radial sectional view from a plane on which the circumference is projected, said plane is passing through the central axis of the capsule of FIG. 1 and through the intersection axis z between planes P and P', wherein the ellipse curve is shown.
Figure 3:
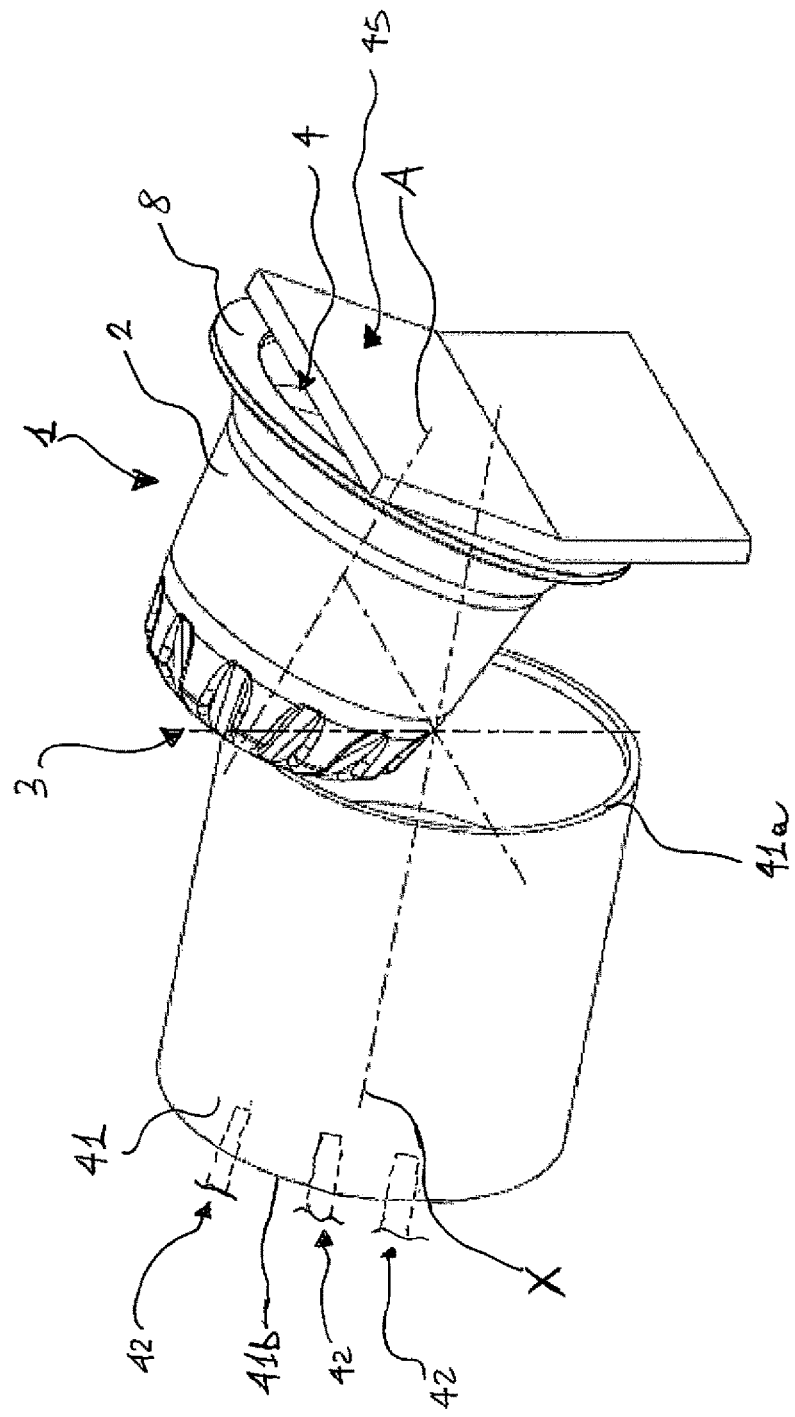
FIG. 3 is a perspective view showing a possible embodiment of the capsule according to the invention when it is inserted into a brewing device having a receptacle.

The capsule according to the invention is used into a beverage preparation device (i.e. a brewing device), schematically shown in FIGS. 3, 3a and 3b, provided with an enclosing member, or receptacle 41, intended to house at least part of the capsule during the beverage preparation process. The brewing device can be further provided with piercing means 42, for example one or more blades or similar elements for piercing the capsule, preferably in correspondence of the water inlet wall of the capsule (inlet wall) in order to feed the brewing liquid, preferably hot water under pressure, inside the capsule. While specific reference will be made to water, it has to be noted that the capsule according to the invention can be used with brewing liquid of different types. In the attached figures, some of the piercing means of the brewing device are schematically shown in FIGS. 2 and 3.

It has to be noted that different shapes of the piercing means 42 of the brewing device can be provided, such as for example blades arranged along a circular line. A new type of brewing device, recently marketed, comprises piercing means, i.e. blades, provided with two flat portions arranged to each other at substantially 90°. According to this shape, the blades are arranged so as they can contact the inlet wall of the capsule along an annular portion, i.e. an annular piercing area. In other words, according to possible embodiments the area of the inlet wall of the capsule that can be contacted by the blades can be seen as a circular line, or an annular portion, substantially corresponding to the circular line or the annular shape along which the piercing means of the brewing device are arranged.

Therefore, the inlet wall 3 of the capsule is provided with at least one piercing area 6 that is extending along a circular line, or along an annular portion, on the inlet wall 3. Preferably the at least one piercing area is arranged between the central axis A and the peripheral edge 2c of the inlet wall 3, i.e. the boundary line between the inlet wall 3 and the lateral wall 2. The brewing water under pressure is injected into the capsule in a known way, e.g. by injection means of the brewing device comprising for example a water pump, not shown in the attached figures.

Even if specific reference will be made in the present description to a closed capsule, it has to be noted that the capsule 1 according to the invention can be an open capsule, i.e. provided with one or more apertures intended to allow the injection of the brewing liquid inside the capsule. It has to be noted that even if the brewing device is provided with piercing means 42, the capsule according to the invention can be open, i.e. provided with one or more inlet openings and the shape of at least one portion of the inlet wall described herein below allows maximizing the internal volume of the capsule and to allow the insertion inside the brewing device, thus avoiding the capsule to be blocked inside it.

In the following, and in the attached figure specific reference will be made to a closed capsule, i.e. a capsule having a closed inlet wall that is intended to be pierced by piercing means of the beverage preparation device inside which the capsule is inserted.

It has to be noted that the capsule according to the invention is preferably made by thermoplastic material, however at least part of the capsule can be made of aluminium.

The capsule, and in particular its inlet wall 3 can be provided with a membrane or foil intended to cover one or more opening provided on the inlet wall.

The capsule 1 according to the invention comprises a lateral wall 2, a water inlet wall 3 and an outlet wall 4, said walls defining a hollow body 5 where the dose of product is located. The water inlet wall 3 is the inlet surface of the capsule and is intended to be perforated by the piercing means 42 of the brewing device to obtain inlet apertures allowing the passage of the brewing liquid into the capsule, if the capsule is a closed capsule. The outlet wall 4 allows the exit of the brewed beverage from the capsule into a container and the outlet means of the capsule, i.e. the elements allowing the exit of the brewed beverage, can be made in different ways.

The outlet wall 4, or the wall comprising the outlet from which the beverage exits the capsule, can be a separate element which is connected to the lower portion of the capsule body 5, in order to close the capsule.

Any suitable constraint means of the outlet wall 4 to the capsule body 5 can be used, and in other possible embodiments the outlet wall 4 may be produced in one piece with the capsule's lateral wall 2.

The outlet wall may be produced in different material with respect to the capsule material, for example, the outlet wall 4 may be a preferably non porous membrane, for instance an aluminium or a laminated foil, preferably a laminated foil including aluminium, as shown in the sectional view of FIG. 2. Other suitable materials are a paper filter, a non-woven fabric or a cap in thermoplastic or similarly rigid or semi-rigid material provided with holes, as already known in other capsules for the production of beverage.

These materials can be also used to form the inlet wall 3 of the capsule.

According to known alternative embodiments, the outlet means may comprise self-perforating elements that are broken under mechanical and/or pressure force acting on the capsule, or one or more holes that are produced by piercing means of the brewing device. Alternatively, outlet means may include open passages. These technologies are readily available to the skilled in the art.

The self-perforating element suitable for the outlet wall 4 is protruding from the lower surface of the outlet wall 4, and is defined by grooves, or lines with reduced thickness, that are breakable under the action of the mechanical force exerted by the brewing device and/or the force exerted by the water fed into the capsule.

Also these means can be used on the inlet wall 3 of the capsule, which can be provided with one or more breakable areas.

A type of self-perforating elements is described in detail in application WO2007/063411, to which reference is made for further details.

Other types of outlet means can be provided, i.e. the extraction of the beverage from the capsule can be obtained, for example, by perforating the capsule by suitable piercing means of the brewing device; in another embodiment, the outlet means is a water-soluble membrane.

As shown in the figures, the capsule 1 has a central axis A (vertical axis) passing through the inlet wall 3 and the outlet wall 4. The later wall 2 can be at least in part circular or conical, i.e. the lateral wall 2 can be parallel or inclined with respect to the central axis A, along its extension between the outlet wall 4 and the inlet wall 3.

According to a preferred embodiment, the body 5 of the capsule is provided with a cup-shape, or a frustoconical shape, in other words the lateral wall 2 is not parallel to the central axis A and the hollow body 5 is closed by the outlet wall 4 at one end and by the inlet wall 3 at the opposite end of the lateral wall with respect to the outlet wall 4.

In any case, it has to be noted that the body 5 of the capsule having a lateral wall 2 that is at least in part circular or conical with respect to the central axis A, is provided with circular cross sections along planes perpendicular with respect to the central axis A of the capsule. According to a possible embodiment, even if the lateral wall 2 of the capsule is formed by inclined surfaces arranged one next to another, in general it forms a circular or conical lateral wall 2 that can be inscribed in a circumference (circular line).

Therefore, in the following description, reference will be made to a circular or conical lateral wall 2 also encompassing embodiments wherein the lateral wall 2 of the capsule is made by a plurality of inclined surface, forming polygonal cross sections along planes perpendicular with respect to the central axis A, that can be inscribed into a circumference.

The lateral wall 2 comprises a peripheral edge 2c, and the water inlet wall 3 extends between the peripheral edge 2c and the central axis A.

Having regard to the thickness t1 of the inlet wall 3, it is preferably constant along its extension from the central axis A towards the lateral wall 2.

It has to be noted that the thickness t1 of the inlet wall is constant except for the one or more areas on its surface where reinforcing means 50, for example in the form of ribs, are arranged. In the case the reinforcing means are in the forms of recess portions 51 the thickness of the recess portion is preferably the same as the thickness of the inlet wall 3 outside the recess.

According to possible embodiments the thickness t1 of the inlet wall 3 is equal to, or lower than, the thickness t2 of the lateral wall 2 of the capsule.

It has to be noted that according to possible embodiments, the lateral wall 2 can be provided with different thickness along its extension between the inlet wall 3 and the outlet wall 4 (as for example in the embodiment shown in FIG. 2). In this case, the thickness t1 of the inlet wall is equal to, or lower than, the maximum thickness of the lateral wall 2. In the case the thickness t1 of the inlet wall 3 is variable, the maximum thickness of the inlet wall 3 is equal to, or lower than, the maximum thickness of the lateral wall 2.

According to possible embodiments, the thickness of the lateral wall 2 and of the inlet wall 3 is comprised in the range 1.6 mm-0.15 mm, and preferably in the range 1.2 mm-0.2 mm. In a preferred embodiment, the thickness t1 of the inlet wall 3 is 0.2-0.5 mm.

The capsule is further provided with a flange-like rim 8 extending from the capsule, preferably in correspondence of the bottom end of the lateral wall 2 in correspondence of outlet wall 4.

Sealing means 9 can be provided on the flange-like rim 8, protruding therefrom, for providing a seal-tight engagement with the receptacle 41 of the brewing device when the capsule is used.

In the shown exemplary embodiment, a sealing element 9 is provided on the flange-like rim 8 of the capsule, i.e. the portion of the capsule designed to be brought in contact with the receptacle 41 of the brewing device, and in particular with the lower circular edge 41a of the receptacle, i.e. the pressing portion of the receptacle 41, for providing the sealing engagement.

Preferably the sealing member 9 is produced in one piece with the flange 8 and it is shaped as an element protruding from the upper surface of the flange 8 of the capsule.

The water inlet wall 3 is shaped to facilitate both the insertion of the capsule into the receptacle 41 of the brewing device and the maximization of the internal volume of the capsule.

Additionally, if the capsule is a closed capsule, the shape of the inlet wall allows the perforation of the inlet wall 3 by piercing means 42 of the brewing device.

These effects are obtained by the shape of the inlet wall 3 of the capsule according to the invention that comprises at least one portion extending along an ellipse curve E defined circumference C (circular line) (shown in FIG. 1a) having the diameter substantially equal to the maximum diameter Dmax of the lateral wall 2 of the capsule that lies on a plane P' (see FIGS. 1a and 1b) that is inclined with respect to a plane P, perpendicular with respect to the central axis A of the capsule. The circumference C is projected on a plane perpendicular with respect to said plane P and passing through an intersection axis z between said planes P and P', or through an axis parallel to the intersection axis z.

Figure 1:
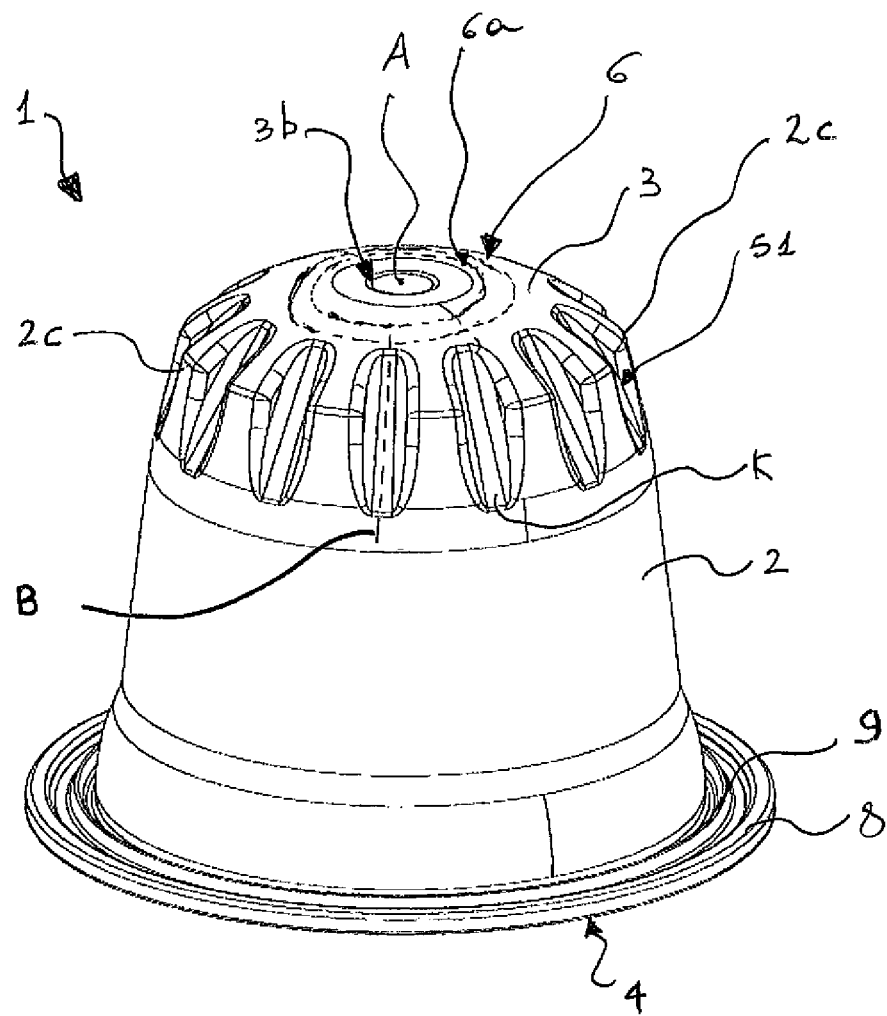
FIG. 1 is a perspective view of a possible embodiment of the capsule according to the present invention.
Figure 1A:
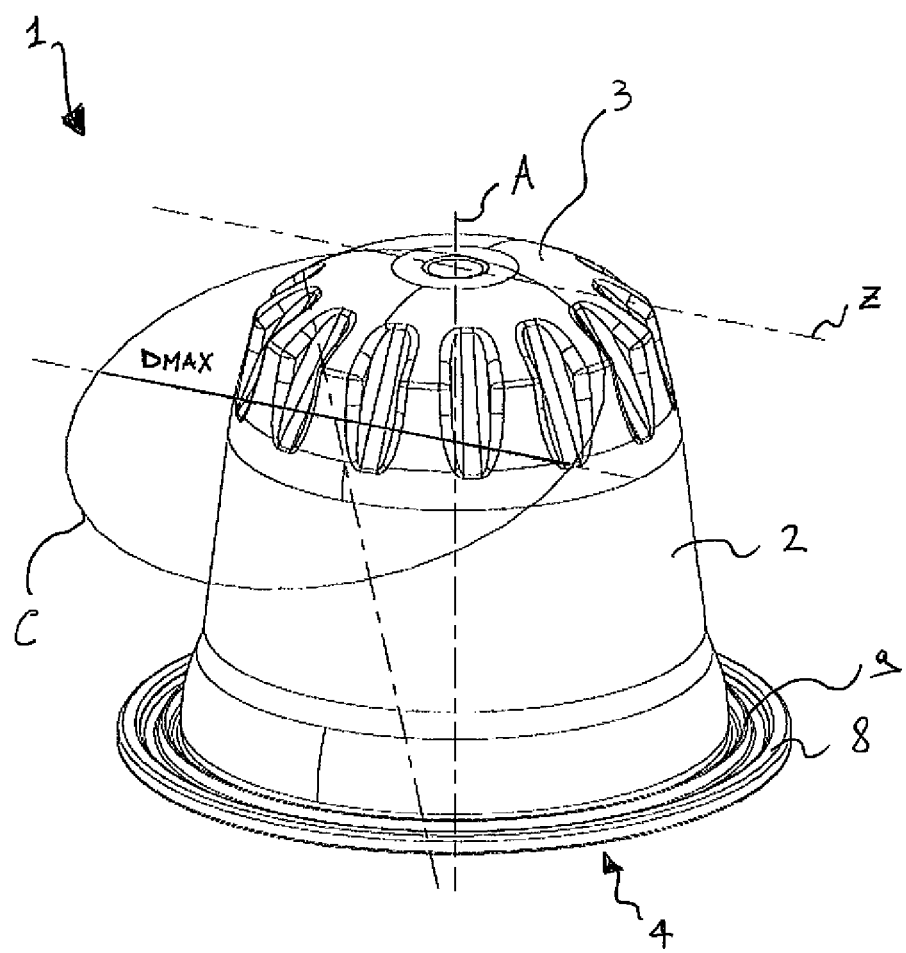
FIG. 1a is a perspective view of a possible embodiment of the capsule wherein the circumference C lying on the plane P' inclined with respect to a plane P perpendicular with respect to the central axis of the capsule is shown.
Figure 1B:
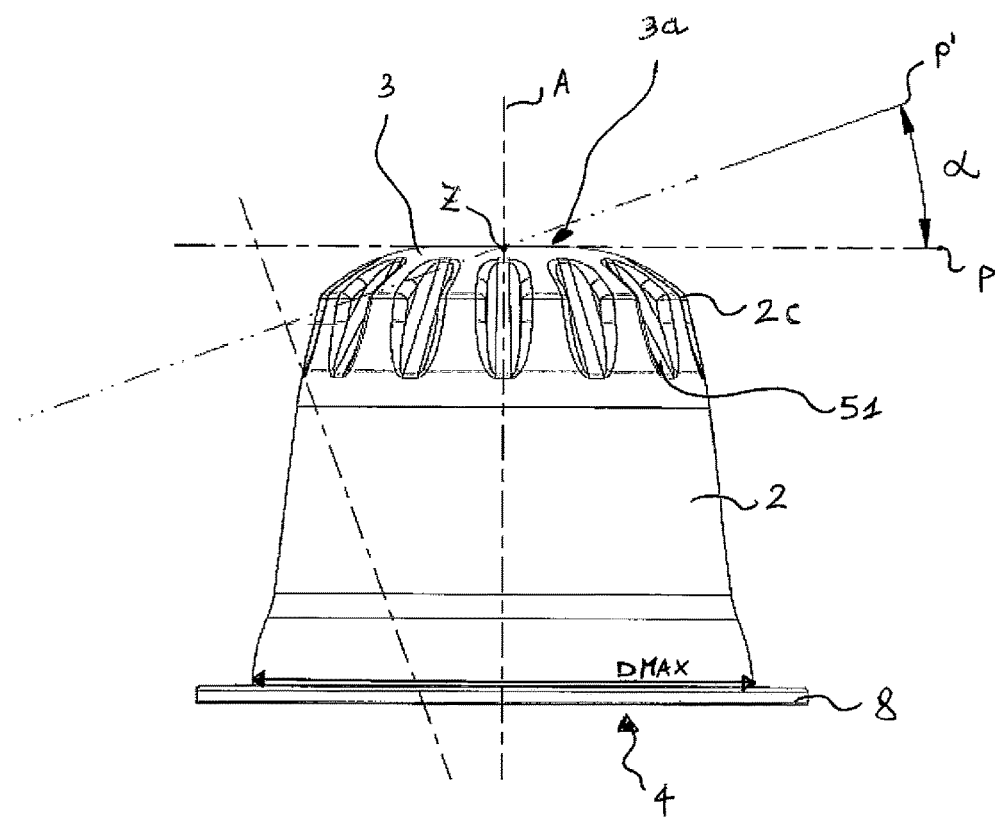
FIG. 1b is a lateral view of a possible embodiment of the capsule wherein the plane P' inclined with respect to a plane P perpendicular with respect to the central axis of the capsule is shown.

In the embodiment shown in FIGS. 1a, 1b and 2, the plane on which the circumference C is projected is a plane passing through the central axis A and the intersection axis z, as shown in FIG. 2. In other words, at least part of the inlet wall 3 that is extending between the central axis A and the lateral wall 2 is shaped as an ellipse curve E seen on a plane perpendicular to the plane P and passing through the intersection axis z, or through an axis parallel to the axis z.

According to a possible embodiment, the plane on which the circumference C is projected is a plane passing through the central axis A of the capsule, for example a radial plane from which the section view of FIG. 2 is taken, and passing through the axis z, or an axis parallel to the axis z.

In the embodiment shown in FIG. 2, the plane P' on which the circumference C lies is inclined with respect to the plane P, perpendicular with respect to the central axis A, about the intersection axis z passing trough said planes P' and P and perpendicular with respect to the central axis A, see FIG. 1a.

It has to be noted that the ellipse curve E can be seen as the projection of the circumference lying on the plane P', on a plane perpendicular to the plane P and passing through the axis z, or an axis parallel to the axis z.

The plane on which the circumference is projected can pass through the central axis A of the capsule and the axis z (as in the embodiment shown in FIG. 2 that is a section view from the plane on which the ellipse is projected), i.e. on a radial plane passing through the central axis A of the capsule and the intersection axis z.

In other words, in a cross sectional view of the capsule taken from a radial plane passing through the central axis A, the inlet wall 3 is at least in part extending along the ellipse curve E.

In particular, the ellipse curve E forms a upper boundary line for the inlet wall 3 that is at least in part following said ellipse curve E, or arranged below said ellipse curve E, as for example shown in FIG. 2.

It has to be noted that the same applies in a three-dimensional view of the capsule 1, wherein the ellipse curve E visible in a radial cross section is rotated along the central axis A of the capsule, thus forming an ellipsoid having the dimension of said ellipse curve E.

In a three-dimensional view the inlet wall 3 is at least in part extending along said ellipsoid surface.

It has to be noted that the shape of the inlet wall 3, and preferably the at least one portion extending along an ellipse curve E, is equal at least in the 80%, more preferably the 95%, and most preferably in the 100% of radial sections taken on planes passing through said central axis A along of the circular extension of the capsule lateral wall 2.

In other words, the shape of the inlet wall 3, seen in a section view along a radial plane passing through the central axis A of the capsule, is constant along the circular extension of the capsule. More in details, the 80%, more preferably the 95%, and most preferably in the 100% of the radial section of the capsule, the shape of the inlet wall is the same.

It has to be noted that the reinforcing means 50, 51, that will be described herein below, can be provided only in some radial sections of the capsule taken along radial planes passing through the central axis A, are not taken into account. In other words, the above reported percentage relates to the inlet wall shape except for the reinforcing means 50, 51, for example in the form of recess portion or ribs, provided on it.

Returning to the shape of the ellipse curve E, the circumference C having a diameter equal to the maximum diameter Dmax of the lateral wall 2 of the capsule lies on a plane P' that is inclined of an angle α with respect to a plane P perpendicular with respect to the central axis A of the capsule. The angle α can be comprised in the range 15°-44°, preferably 15°-30° and more preferably 16°-25°

According to exemplary embodiments, the angle α is comprised in the range 18°-22°, and preferably in the range 19°-21°, and most preferably the angle α is about 20°.

These ranges of inclination was found to be particularly advantageous by the Applicant in order to define a shape of the inlet wall 3 able to both maximizing the internal volume of the capsule, and to allow an effective perforation.

It has to be also noted that the axis passing through the centre of the circumference C lying on said plane P' is inclined with respect to the central axis A of the capsule of an angle α.

In general, the angle α of inclination of said plane P' and said plane P perpendicular with respect to the central axis A of the capsule is substantially equal to the angle of inclination γ between the central axis of the capsule A and the axis X along which the receptacle 41 of the brewing device is movable.

In fact, as it will be discussed later in connection to the brewing device inside which the capsule is inserted, the circumference C having diameter equal to the maximum diameter of the capsule's lateral wall 2 lying on a plane P' inclined with respect to a plane P which is perpendicular to the central axis A of the capsule, and that is further projected on plane perpendicular to the plane P and passing through the axis z, or a an axis parallel to the axis z, allows to provide an effective insertion of the capsule inside the receptacle 41 of the brewing device.

In fact, the angle α of inclination between the plane P' on which the circumference lies and the plane P, perpendicular with respect to the central axis A of the capsule, substantially corresponds to the angle γ of inclination of the central axis A of the capsule, when it is inserted into the brewing device, and the axis X along which the receptacle is movable. Additionally, said circumference C having a diameter equal to the maximum diameter of the capsule's lateral wall 2 can be seen as a circumference corresponding to the pressing circular edge 41a of the receptacle 41 of the brewing device, see herein below for further detail where the beverage preparation system according to the invention is described.

It has to noted that the projection of said circumference C on a plane perpendicular to the plane P and passing through the axis z, or an axis parallel to the axis z, leads to the formation of an ellipse curve E having a major axis (major diameter of the ellipse) E2 that is substantially equal to the maximum diameter Dmax of the lateral wall 2 of the capsule, i.e. the diameter of the circumference projected on said inclined plane, and a minor axis (minor diameter of the ellipse) E1 equal to the maximum diameter Dmax of the lateral wall 2 multiplied by the sine of the angle α, according to the mathematic formula E1=Dmax*sin(α). As it can be easily understood, the semi-minor axis of the ellipse curve E is equal to the diameter of said circumference divided by two, i.e. said maximum diameter divided by two, and multiplied by the sine of the angle α, according to the mathematic formula (E1)/2=(Dmax/2)*sin(α), see FIG. 2.

According to exemplary embodiments, the maximum diameter Dmax of the lateral wall 2 of the capsule is comprised in the range 27 mm-33 mm, preferably 28 mm-32 mm, more preferably, 29 mm-31 mm and most preferably is about 30 mm.

In general, the maximum diameter Dmax of the lateral wall of the capsule is substantially equal to, or slightly less than, the diameter DR of the circular pressing edge 41a of the receptacle 41 of the brewing device inside which the capsule is inserted.

It has to be noted that according to a preferred embodiment, as also shown in the attached figures, the ellipse curve E is arranged with its minor axis E1 substantially coincident with the central axis A and is tangent to the highest point, or area 3a, of the inlet wall 3 with respect to the outlet wall 4.

The expression "the minor axis E1 is substantially coincident with the central axis A" is used to indicate that the minor axis of the ellipse curve E can be also arranged parallel and close to the central axis A of the capsule, and/or slightly inclined with respect to the central axis A of the capsule.

The highest point or area 3a of the inlet wall is used herein to indicate the area of the inlet wall that is arranged at maximum distance H from the outlet wall 4.

According to a possible embodiment, the plane P perpendicular with respect to the central axis A of the capsule is tangent to the highest point or area 3a of the inlet wall 3 of the capsule.

According to different possible embodiments, the distance H between the highest point, or area 3a, of the inlet wall 3 and the outlet wall 4 is comprised in the range 26 mm-30 mm, preferably 27 mm-29 mm, and more preferably is about 28 mm.

The distance H of the highest point, or area 3a, of the inlet wall 3 from the outlet wall 4 identifies the height of the capsule 1.

In general, distance H between said highest point, or area 3a, of the inlet wall 3 and the outlet wall 4 is selected so as the capsule can be inserted into the brewing device.

According to an aspect of the present invention, the distance H between the highest point or area 3a of the capsule and the outlet wall 4, is less than the distance H1 between the surface 45 along which the outlet wall 4 is moved when the capsule is inserted inside the brewing device, and the first portion 41c of the pressing edge 41a of the receptacle 41 of the brewing device encountered by the highest point, or area 3a, of the inlet wall 3 with respect to the outlet wall 4, when the receptacle is in an open position for the insertion of the capsule.

Preferably, the distance H1 between the surface 45, i.e. the plane formed by suitable guide means of the brewing device, along which the outlet wall of the capsule is moved when the capsule is inserted inside the brewing device, and the first portion 41c encountered by the capsule, is measured along axis perpendicular with respect to the surface 45 and in general with respect to the outlet wall 4 of the capsule (as shown in FIG. 3a).

With the expression "first portion encountered" is meant the portion of the receptacle 41 that is first encountered by the capsule, and preferably by the capsule inlet wall, when the capsule is inserted inside the brewing device and the receptacle is in open position.

In a preferred embodiment, the capsule is inserted from above with respect to the brewing device and the first portion of the receptacle encountered by the inlet wall of the capsule is the upper edge 41c of the circular pressing edge 41a, i.e. the edge passing through a vertical diameter of the receptacle (see FIG. 3a).

According to a preferred embodiment the inlet wall 3 is extending along the ellipse curve E, substantially from the central axis A to the piercing area 6, and preferably from the central axis A to the closest end part 6a of the piercing area 6 with respect to the central axis A.

It has to be noted that with the expression "end part 6a of the piercing area 6 closest to the central axis A of the capsule" is meant the at least one point, or area, of the piercing area 6 nearest to the central axis A of the capsule. As mentioned above, the piercing area 6 is preferably circular or annular shaped, and the closest end part 6a of the piercing area corresponds to the circular line itself, or to the closest circular line of the annular piercing area with respect to the central axis A.

The elliptic shape of the inlet wall at least in the area between the central axis A and the closest end part 6a of the piercing area 6 with respect to the central axis A of the capsule was found particularly advantageous in some experimental tests carried out by the Applicant. In particular, the described elliptic shape of the inlet wall allows to increase the internal volume of the capsule and at the same time to provide an effective perforation of the inlet wall 3.

It has to be noted that according to a possible embodiment, the ellipse curve E is not followed by the inlet wall 3 in correspondence of the area around the central axis A, as for example in the embodiment shown in the figures, wherein the inlet wall 3 comprises a substantially flat top portion 3b.

In other words, as for example shown in the cross sectional view of FIG. 2 taken from a radial plane passing through the central axis A of the capsule, the inlet wall 3 is provided with a top portion 3b that is substantially flat. The flat top portion is preferably used as injection point for the moulded material in the production process of the capsule.

According to a possible embodiment, the inlet wall 3 is extending along the ellipse curve E between the highest point, or area 3a, of the inlet wall 3 with respect to the outlet wall 4, and the closest end part 6a of the piercing area 6 with respect to the central axis A. In fact, according to a preferred embodiment, the highest point 3a of the inlet wall is arranged between the central axis A and the closest end part 6a of the piercing area 6 with respect to the central axis A.

As mentioned above, for example with reference to the top flat portion 3b of the inlet wall 3, according to possible embodiments, the inlet wall 3 comprises at least one portion 3b, 3c that is not extending along the ellipse curve E.

Preferably, the portion 3b, 3c of the inlet wall 3 that is not extending along the ellipse curve E is arranged below the ellipse curve E.

In this regard it has to be noted that the shape of the inlet wall 3 is also influenced by the shape of the receptacle 41 of the brewing device inside which the capsule is inserted during the beverage preparation process.

The at least one portion 3c extending below the ellipse curve E can be a portion of the inlet wall 3 arranged between the piercing area 6 and the lateral wall 2. In particular, said portion 3c extending below the ellipse curve E is arranged between the closest end part 6a of the piercing area 6 and the lateral wall 2.

Even if the not shown in the figures, it has to be noted that the shape of the inlet wall 3 described above, having at least a portion that is extending along the ellipse curve E allow an effective perforation with different shapes of the piercing means of the brewing device.

According to an aspect of the invention, the capsule can be further provided with reinforcing means 50, 51 in order to increase the rigidity of the inlet wall 3 and/or of the lateral wall 2, thus facilitating the perforation of the inlet wall. According to different possible embodiments the reinforcing means 50, 51 can extend on the inlet wall 3 and/or on the lateral wall 2.

The reinforcing means can be shaped in the form of at least one recess portion 51 completely contained within the inlet wall 3, or extending on both the lateral wall 2 and the water inlet wall 3.

It has to be also noted that the reinforcing means can be shaped in the form of one or more ribs 50 protruding from the water inlet wall 3 surface and arranged circumferentially and/or radially on the water inlet wall 3.

According to a possible embodiment, as also shown in FIG. 2, the capsule 1 comprises at least one rib 50 and/or at least one recess portion 51 extending on the inlet wall 3 and/or on the lateral wall 2 of the capsule.

More in detail, the capsule according to the invention, can be provided with reinforcing means comprising at least one, preferably a plurality of recess portions 51 extending on both the inlet wall 3 and on the lateral wall 2 and connecting together areas of said walls. In other words, the capsule is provided with at least one recess portion 51 forming a corrugation in correspondence of the peripheral edge 2c of the lateral wall 2. It has to be noted that the at least one recess portion 51 defines a modification of the shape of both the inlet wall 3 and of the lateral wall 2 in correspondence of the peripheral edge 2c of the lateral wall 2 from which the inlet wall 3 extends.

Recess portion 51 comprises at least one surface connecting the lateral wall to the inlet wall of the capsule and forming an additional wall that connects lateral and inlet walls 2, 3. Preferred embodiments of a capsule having recess portions are disclosed in pending application PCT/IB2012/0028.

The at least one recess portion 51 comprises at least one surface, preferably the bottom surface of the recess portion, that lies on a plane K (see FIG. 1) or it contains at least one axis B maintaining a constant angle of inclination with respect to the central axis A of the capsule, or with respect to a vertical axis parallel to the central axis.

Preferably the plane K or the at least one axis B of the surface are directed towards and/or intersect the central axis A of the capsule or a vertical axis parallel to the central axis A. Preferably, the at least one surface of the recess portion that maintains a constant angle of inclination with respect to the central axis A of the capsule or a vertical axis is the bottom surface of the recess portion, preferably extending between the closest and the farthest end parts of the recess portion 51, with respect to the central axis A of the capsule. This surface is preferably flat, in fact, said surface lies on a plane K or it contains at least one straight line B (axis). Moreover, the at least one surface of the recess portion preferably maintains a constant angle of inclination with respect to the central axis A of the capsule, or to an axis parallel to it, along its complete extension. Preferably, the inclined surface forms an acute angle with the vertical, i.e. with respect to a direction parallel to the central, vertical rotational axis, i.e. the longitudinal axis A of the capsule, or, more simply, with axis A. Generally the acute angle, as defined above, is comprised in the range 10°-75°, preferably 25°-60°, most preferably about 35°-50°.

The number of the recess portion can be varied according to different possible embodiments. In general the number of recess portion 51 is not equal to the number of the piercing means (piercing blades) of the brewing device in which the capsule is used and in particular the number of the recess portion 51 is not divisible for the number of piercing means 42 of the brewing device.

This increase in the random positioning of the capsule with respect to the piercing elements will reduce the possible bad functioning of the system.

Moreover, as shown in FIG. 2, the capsule 1 can be provided with a plurality of ribs 50 protruding from the internal, or external, surface of the inlet wall 3. The ribs 50 are preferably arranged in a radial manner from the internal central surface of the inlet wall 3, substantially from the central axis A.

The ribs are arranged in area of the inlet wall comprised between the central axis A and the closest end 6a of the piercing area 6.

Furthermore, in a possible embodiment, the capsule is provided with vertical lugs 60 (see FIG. 2) protruding from the internal surface of the lateral wall 2 and intended to impede the capsules from stacking during the production process. Thickness, shape and radius of such lug(s) will vary depending on the chosen manufacturing methods, to be selected amongst the ones mentioned earlier, as it can easily be inferred by the skilled in the art.

Vertical lugs 60 can extend on both the inlet and lateral walls 3 and 2, or they can be provided only on the lateral wall 2 of the capsule.

The capsule 1 according to the invention can be used in a beverage preparation device (brewing device), thus providing a system for the beverage preparation. The brewing device, schematically shown in FIGS. 3, 3a and 3b, comprises a receptacle 41 for housing at least part of said capsule. As mentioned above, both open capsule and closed capsule according to the invention can be used in the system, even if in the following specific reference will be made to closed capsule.

The brewing device can be further provided with piercing means 42 for piercing said capsule inlet wall 3 in correspondence of the at least one piercing area 6, In use, the receptacle 41 of the brewing device is moved with respect to the capsule 1, and/or vice versa, so that a seal-tight engagement with the capsule 1 (preferably at the flange-like rim 8) can be obtained and the piercing means 42 are brought in contact with the capsule.

In the closed position of the receptacle, a closed capsule is perforated in correspondence of the piercing area 6 of the inlet wall 3 of the capsule.

In detail, the receptacle 41 is movable along an axis X, that is preferably horizontal, between an open position (shown in FIGS. 3, 3a and 3b) in which the capsule can be inserted into the brewing device and a closed position (not shown) wherein the capsule is housed inside the receptacle. The capsule 1 is arranged inside the brewing device with its central axis A inclined of an angle γ with respect to the axis X along which the receptacle is movable (see the lateral view of FIG. 3a).

In particular, in a known type of brewing device, inclined guides (schematically shown in FIGS. 3, 3a and 3b) are provided to form a sliding surface 45 to insert the capsule inside the brewing device with its central axis A inclined with respect to the axis X of movement of the receptacle 41.

In the known devices, said inclined guides cooperates with the flange-like rim 8 of the capsule to provide such an inclined position of the central axis A with respect to the axis X along which the receptacle is movable. Notwithstanding this, generic reference to a surface 45 along which the outlet wall 4 of the capsule will be used.

The angle γ between the central axis A and the movement axis X of the receptacle 41 is substantially equal to the angle α between the plane P' on which the circumference C having the diameter substantially equal to the maximum diameter Dmax of the lateral wall 2 lies, and the plane P perpendicular with respect to the central axis of the capsule. By doing so, the ellipse curve E, and thus the inlet wall 3 shape, substantially extending along said ellipse curve E, allows the capsule 1 to be housed inside the receptacle 41 and at the same time allows to maximize the internal volume of the capsule, taking into account the inclined position of the central axis A of the capsule when it is inserted inside the brewing device.

It has to be understood that the circumference C having a diameter equal to the maximum diameter of the capsule's lateral wall 2, used to define the ellipse curve E, can be seen to substantially correspond to the pressing circular edge 41a of the receptacle 41 of the brewing device. When the capsule is inserted into the brewing device, the central axis A is inclined of an angle γ with respect to the axis X of the direction of movement of the receptacle 41 (see for example the schematic views of FIGS. 3, 3a and 3b).

The angle γ used in known brewing device is comprised in the range 15°-44°, preferably 15°-30° and more preferably 16°-25°.

According to exemplary embodiments, the angle γ is comprised in the range 18°-22°, and preferably in the range 19°-21°, and most preferably the angle γ is about 20°.

As better visible in FIG. 3a, when the capsule is inserted inside the brewing device, the circumference C corresponding to the circular pressing edge 41a of the brewing device lies on a plane P' that is inclined with respect to a plane P that is perpendicular with respect to the central axis A of the capsule.

The circumference C, corresponding to the circular pressing edge 41a, projected from said plane P' on a plane perpendicular with respect to the plane P and passing through the intersection axis z between planes P and P', or an axis parallel to the axis z, defines the ellipse curve E.

Therefore, it follows that the projection of a circumference having diameter equal to the maximum diameter of the capsule's lateral wall 2 on a plane perpendicular to the plane P and passing through the axis z, thus forming said ellipse curve E, corresponds to the shape of the pressing circular edge 41a of the receptacle 41 of the brewing device seen on a plane perpendicular to the plane P and passing through the axis z, when the capsule is inserted into said brewing device (see FIGS. 3, 3a and 3b).

In fact, FIG. 3b shows the capsule and the receptacle 41 from a plane A-A indicated in FIG. 3a, that is perpendicular to plane P and passing through an axis parallel to the axis z. In this view, the pressing edge 41a corresponds to said ellipse curve E.

As already mentioned above, the plane on which the circumference C is projected can be a plane passing through the central axis A of the capsule and the intersection axis z, or an axis parallel to the axis z.

More in detail, in FIG. 3b the circular pressing edge 41a of the receptacle is visible on a plane A-A parallel to the central axis A of the capsule and passing through an axis parallel to the axis z, when it is inserted in the brewing device according to the invention. The plane through which the circular edge 41a is visible is inclined of an angle γ with respect to the axis X of movement of said receptacle 41. As shown in FIG. 3b, the circular pressing edge 41a of the receptacle 41 seen on this plane A-A is an ellipse curve E.

It has to be further noted that the axis X is passing through the centre of the circular pressing edge 41a of the receptacle.

Additionally, it has to be noted that the diameter DR of the pressing circular edge 41a is substantially equal to the maximum diameter Dmax of the lateral wall 2 of the capsule. By doing so, by using a circumference C lying on a plane P' that is inclined with respect to a plane P perpendicular with respect to the central axis of the capsule, allows to take into account the dimension of the pressing circular edge 41a of the brewing device during the sizing process of the capsule.

Additionally, the distance H between the highest point, or area 3a, of the inlet wall 3 and the outlet wall 4 of the capsule 1 is selected so as the capsule 1 can be inserted into the brewing device when the receptacle is the open position, According to a preferred embodiment, as already discussed above, the distance H between said highest point, or area 3a, of said inlet wall 3 and the outlet wall 4 is less than the distance H1 between the surface 45 along which the outlet wall 4 is moved when the capsule is inserted inside the brewing device, and the first portion 41c of the pressing edge 41a of the receptacle 41 of the brewing device encountered by the highest point, or area 3a, of the inlet wall 3 with respect to the outlet wall 4, when the receptacle is in the open position for the insertion of the capsule.

The distance H may be selected so that the highest point 3a, or area, of the inlet wall 3 does not contact the upper surface 41b of the receptacle 41, when the receptacle is in said closed position and the capsule is housed inside the receptacle.

The invention claimed is:

1. A capsule for preparation of a beverage from a brewing device, the capsule comprising:
    a lateral wall that is circular or conical; and
    a water inlet wall and an outlet wall that are connected to the lateral wall to form a hollow body where a brewing product is contained, the hollow body of the capsule having a central axis passing through the inlet wall and the outlet wall, wherein
    at least one portion of the inlet wall is extending along an ellipse curve as defined by a circumference, having a diameter substantially equal to a maximum diameter of the lateral wall of the capsule lying on a first plane that is inclined at an angle with respect to a second plane perpendicular with respect to the central axis of the capsule, the first and second planes intersecting at an intersection axis, an axis passing through a center of the circumference lying on the first plane is inclined at the angle with respect to the central axis, the circumference being projected on a third plane that is perpendicular to the second plane and that contains an axis selected from the intersection axis or an axis parallel to the intersection axis, to obtain the ellipse curve, the ellipse curve is tangent to a highest point, or area, of the inlet wall with respect to the outlet wall, and the angle is in a range of 15°-44°.

2. A capsule according to claim 1, wherein the ellipse curve is arranged with its minor axis substantially coincident with the central axis.

3. A capsule according to claim 1, wherein the at least one portion of the inlet wall extending along the ellipse curve is between the central axis and a peripheral edge between the inlet wall and the lateral wall.

4. A capsule according to claim 1, wherein the inlet wall comprises at least one piercing area configured to be contacted by a piercer of the brewing device, the at least one portion of the inlet wall extending along the ellipse curve, is substantially between the central axis and the piercing area, or between the central axis and a closest end part of the piercing area with respect to the central axis.

5. A capsule according to claim 1, wherein the angle is in a range of 18°-22°.

6. A capsule according to claim 1, wherein the ellipse curve has a major axis that is substantially equal to the maximum diameter (Dmax) of the lateral wall of the capsule, and a minor axis (E1) that is equal to the maximum diameter of the lateral wall multiplied by the sine of the angle (α) according to a mathematic formula E1=Dmax*sin (α).

7. A capsule according to claim 1, wherein the maximum diameter of the lateral wall of the capsule is in a range of 27 mm-33 mm.

8. A capsule according to claim 1, wherein a distance between the highest point, or area, of the inlet wall and the outlet wall is in a range of 26 mm-30 mm.

9. A capsule according to claim 1, wherein the inlet wall shape is equal at least in 80% of radial sections taken on planes passing through the central axis along a circular extension of the capsule lateral wall.

10. A capsule according to claim 1, wherein the inlet wall comprises at least one portion extending below the ellipse curve.

11. A capsule according to claim 10, wherein the at least one portion extending below the ellipse curve is arranged between at least one portion of a piercing area and the lateral wall and/or in correspondence with the central axis of the capsule.

12. A capsule according to claim 1, wherein a thickness of the inlet wall is constant along its extension from the central axis towards the lateral wall.

13. A capsule according to claim 1, wherein a thickness of the inlet wall is equal to, or lower than, a thickness of the lateral wall of the capsule.

14. A capsule according to claim 1, further comprising a reinforcing structure extending on the inlet wall and/or on the lateral wall.

15. A capsule according to claim 14, wherein the reinforcing structure comprises one or more ribs protruding from a water inlet wall surface and arranged circumferentially and/or radially on the inlet wall.

16. A capsule according to claim 14, wherein the reinforcing structure comprises at least one recess portion completely contained within the inlet wall or extending on both the lateral wall and the inlet wall.

17. A capsule according to claim 1, wherein at least one piercing area is extending along a circular line, or along an annular portion on the inlet wall.

18. A capsule according to claim 1, wherein the circumference, having the diameter substantially equal to the maximum diameter of the lateral wall of the capsule and lying on the first plane that is inclined at the angle with respect to the second plane perpendicular with respect to the central axis of the capsule, corresponds to a circular pressing edge of a receptacle of the brewing device inside which the capsule is inserted.

19. A capsule according to claim 1, wherein a distance between the highest point, or area, of the inlet wall and the outlet wall is less than distance between a surface along which the outlet wall is moved when the capsule is inserted inside the brewing device, and a first portion of a pressing edge of a receptacle of the brewing device is encountered by the highest point, or area, of the inlet gall with respect to the outlet wall, when the receptacle is in an open position for insertion of the capsule.

20. A system for preparing a beverage comprising:
the capsule according to claim 1; and
a brewing device comprising a receptacle to house at least part of the capsule, wherein the receptacle is movable along an axis, between an open position in which the capsule is insertable into the brewing device and a closed position wherein the capsule is housed inside the receptacle, and the receptacle comprises a circular pressing edge.

21. A system according to claim 20, wherein the circular pressing edge of the receptacle has a diameter substantially equal to the maximum diameter of the lateral wall of the capsule and lies on the first plane that is inclined at a first angle with respect to the second plane perpendicular with respect to the central axis of the capsule.

22. A system according to claim 21, wherein the capsule is arranged inside the brewing device with the central axis inclined at a second angle with respect to the axis along which the receptacle is movable.

23. A system according to claim 21, wherein the first angle is in a range of 15°-44°.

24. A system according to claim 22, wherein the second angle is substantially equal to the first angle.

25. A system according to claim 20, wherein the receptacle comprises a center passing through the axis along which the receptacle is movable.

26. A system according to claim 20, wherein a distance between the highest point, or area, of the inlet wall and the outlet wall of the capsule is selected so that the capsule is insertable into the brewing device when the receptacle is in the open position.

27. A system according to claim 20, wherein a distance between the highest point, or area, of the inlet wall and the outlet wall of the capsule is selected so that the highest point, or area, of the inlet wall does not contact an upper surface of the receptacle, when the receptacle is in the closed position and the capsule is housed inside the receptacle.

28. A system according to claim 20, further comprising a piercer to pierce the capsule inlet wall in correspondence with at least one piercing area, and a receptacle to house at least part of the capsule.

* * * * *